United States Patent [19]

Lehureau et al.

[11] 4,139,263
[45] Feb. 13, 1979

[54] OPTICAL DEVICE FOR PROJECTING A RADIATION BEAM ONTO A DATA CARRIER

[75] Inventors: Jean-Claude Lehureau; Claude Bricot, both of Paris, France

[73] Assignee: Thomson-Brandt, Paris, France

[21] Appl. No.: 726,474

[22] Filed: Sep. 24, 1976

[30] Foreign Application Priority Data

Sep. 29, 1975 [FR] France .................................. 75 29706

[51] Int. Cl.² .......................... G11C 13/04; G11C 7/02
[52] U.S. Cl. .............................. 350/157; 179/100.3 V;
358/128
[58] Field of Search ................. 179/100.3 V; 358/128,
358/157

[56] References Cited

U.S. PATENT DOCUMENTS 3,919,698  11/1975  Bricot et al. .................... 179/100.3 V
3,944,727  3/1976  Elliott ............................. 179/100.3 V

OTHER PUBLICATIONS

Jenkins et al., *Fundamentals of Optics*, 3rd edition, McGraw-Hill Book Co., New York, 1957, p. 229.

Primary Examiner—John K. Corbin
Assistant Examiner—R. A. Rosenberger
Attorney, Agent, or Firm—Cushman, Darby & Cushman

[57] ABSTRACT

The invention relates to an optical reading device, for the read out of data carried by a reflecting support, wherein the source is a non-polarized laser of which the exit surface is reflective; the optical noise due to the reflection of the incident wave at the support is partially suppressed by inserting between the last partially polarizing and/or birefractive element and the data carrier a quarter wavelength plate which optically decouples the incident wave and the return wave. The optical noise is thus limited to the beats between the incident wave and the return wave reflected a second time by the support.

3 Claims, 3 Drawing Figures

4,139,263

OPTICAL DEVICE FOR PROJECTING A RADIATION BEAM ONTO A DATA CARRIER

This invention relates to optical devices comprising reflectors wherein means for reducing the optical noise due to the reflectors are provided.

Optical devices intended for reading or recording information on a reflecting or partially reflecting support generally comprise a source of the laser type which in general is not polarized. Sources such as these emit in the Doppler emission line several modes which are unstable in frequency as a result of variations in length of the laser cavity, the frequency deviation remaining substantially constant between two modes. In the case of laser sources having a length of from 10 to 50 cm, which is of the order of magnitude of the cavities used in conventional systems, this frequency deviation amounts to between 1500 and 300 MHz; in conventional detection systems, there is no need to take beats between two successive modes into consideration.

In the case of a gas laser of suitable cavity length, helium-neon for example, emission takes place in accordance with two modes and it is possible by experiment to determine that these two modes are circularly polarized in opposite directions. Since these two modes are considered as being non-coherent with one another, the optical noise capable of being produced in a system comprising a reflector which forms a cavity with the exit surface of the laser is due to the beats between each of the incident waves and the corresponding return waves. The resulting optical noise may be significant and can interfere seriously with the operation of the system, the noise level being dependent above all upon the beats between the incident waves and the return waves of the first order, i.e. the waves which have made a complete forward and return passage in the cavity.

In order to reduce noise of this kind, it is proposed in accordance with the invention to introduce into the path of the beam a quarter wavelength plate relative to the mean emission wavelength of the source, this plate being positioned at the end of the outward path in the optical cavity formed in such a way that the incident wave and the corresponding first-order return wave are optically decoupled.

According to the invention there is provided an optical device for projecting a radiation beam onto a moving reflective data carrier, said device comprising an illumination source having a reflective exit surface for emitting said beam, and birefractive and partially polarizing optical elements for the propagation of said beam towards said data carrier along a path, said beam being composed of vibrations circularly polarized in one and the same polarization plane, two orthogonal directions in said polarization plane being invariant in relation to said propagation path, said device further comprising a quarter wavelength plate relative to the mean wavelength of said beam, said plate being located on said path, parallel to said polarization plane between the last of said optical elements and said carrier, said plate having orthogonal neutral lines oriented at $\pi/4$ relative to said invariant orthogonal directions.

For a better understanding of the invention and to show how the same may be carried into effect, reference will be made to the following description and the attached drawings among which:

Figure 1:
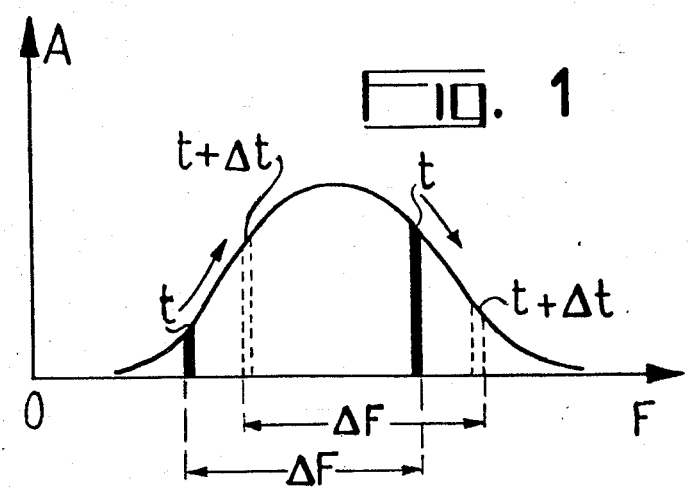
FIG. 1 shows the emission spectrum of a conventional gas laser source.

A so-called non-polarized laser is an amplifying resonant cavity of given length which, unlike a polarized laser, is perfectly symmetrical in the axial direction. As shown in FIG. 1, the laser emission takes place in the Doppler emission line in accordance with a number of operative modes dependent upon the laser cavity. It has been assumed in the drawing that the cavity emits in two modes. These two modes may deviate in frequency between t and t + $\Delta$t, although the total energy emitted by the laser does not undergo any significant fluctuations, the sum total of the variable energies emitted remaining substantially constant. Each of the two modes emitted by the laser cavity is circularly polarized, as mentioned above.

When a source of this type is used for example in a system for reading a videodisc by reflection, each of the modes emitted passes through the optical reading system where it is partially polarized and subjected to the birefractive effects of the elements through which it passes. The beam is then reflected (completely or partly) by the support to be read. Part of the beam thus reflected passes through a separation device and is received by reading cells, although the separation device returns to the laser part of the beam which passes back through the optical system, undergoing again the effects of partial polarization and birefraction before being reflected by the exit surface of the laser cavity. If no additional precautions are taken, the return wave, which corresponds to one of the modes emitted, is elliptically polarized and, with the circularly polarized wave emitted, gives rise to beats which introduce noise harmful to the operation of the device.

Figure 2:
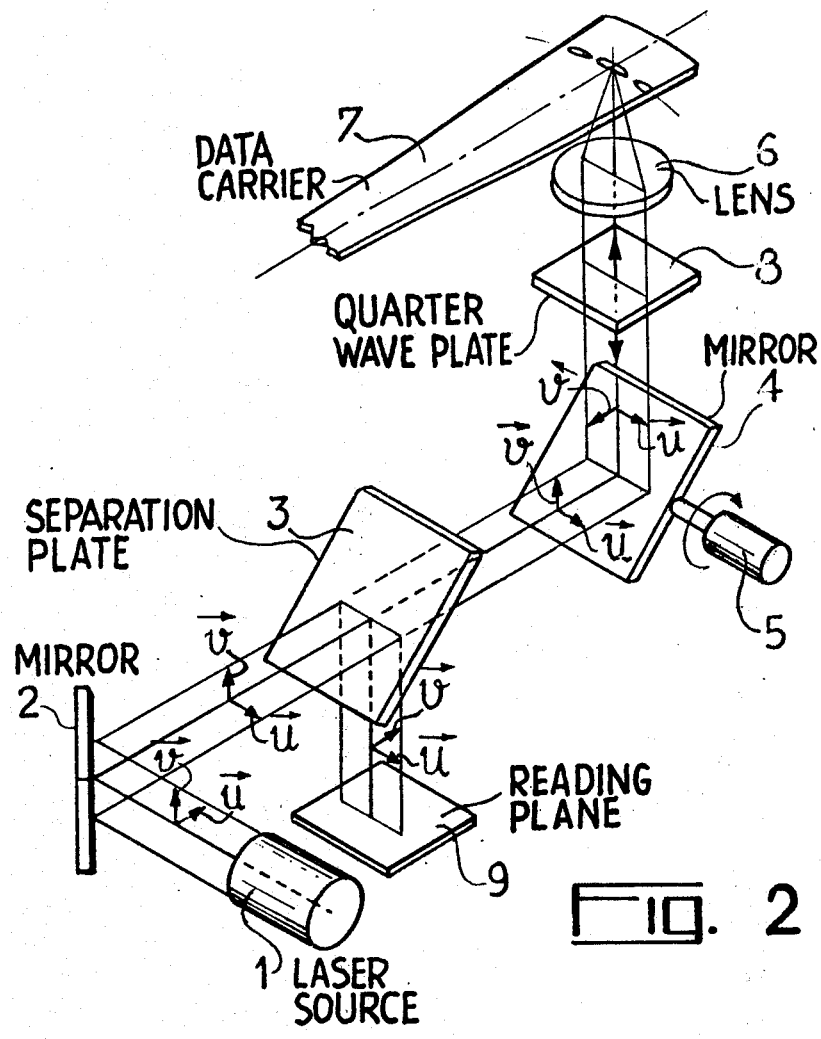
FIG. 2 shows an optical device for the read-out of information according to the invention.

An optical videodisc reader using the method of reducing optical noise according to the invention is illustrated in FIG. 2. It comprises an axially symmetrical laser source 1 emitting in two modes circularly polarized in opposite directions, as indicated above. The beam emitted is reflected by a first mirror 2 towards a separation plate 3. That fraction of the beam which is transmitted by this separation plate is received by a second mirror 4 capable of rotating about its axis 5 in such a way that the incidence plane is maintained during this rotation. This mirror returns the beam which it receives to a reading lens 6 which focusses the reading beam on the impression carrying the information of a data carrier 7 (partly shown in the drawing). The device according to the invention comprises, inserted between the last reflecting element and the reading lens, in the path of the reading beam, a quarter wavelength plate 8 relative to the mean wavelength of the Doppler emission line of the laser source 1. The neutral lines of this plate are oriented at 45° from the intersection of the incidence plane on this second mirror with the quarter wavelength plate. In addition, the incidence planes, during the successive reflections, must of necessity be parallel or orthogonal to the incidence plane on the first mirror. These conditions which are necessary for the correct operation of the arrangement will be explained hereinafter. The beam reflected by the support passes through the lens 6 and the quarter wavelength plate 8, is reflected by the rotating mirror 4 and the useful part of this beam is reflected by the separation plate 3 towards the reading cells situated in the reading plane 9.

It has already been seen that the two modes emitted by the cavity are circularly polarized. Each of them can be decomposed into two orthogonal rectilinear vibrations of equal amplitude, phase-shifted by $\pi/2$. It is known that, if a rectilinear vibration incident upon a mirror is parallel or perpendicular to the incidence plane, the reflected rectilinear vibration is itself also parallel or perpendicular to the incidence plane.

Having selected the two axes of the polarization plane respectively parallel and perpendicular to the incidence plane on the first mirror as the decomposition axes of the incident circular vibrations, these directions are maintained in the polarization plane of the reflected beam. In order to ensure that this property remains intact over the entire path of the beam, the incidence planes on the reflecting surfaces of the system must be parallel or orthogonal. One possible arrangement is shown in FIG. 2 wherein the incidence plane on the first mirror is orthogonal to the incidence plane on the second mirror which is itself coincident with the incidence plane on the separation plate reflecting the return beam.

The unit vectors $\vec{u}$ and $\vec{v}$ of the invariance axes of the polarization plane have been shown on the path of the reading beam in the drawing.

Figure 3:
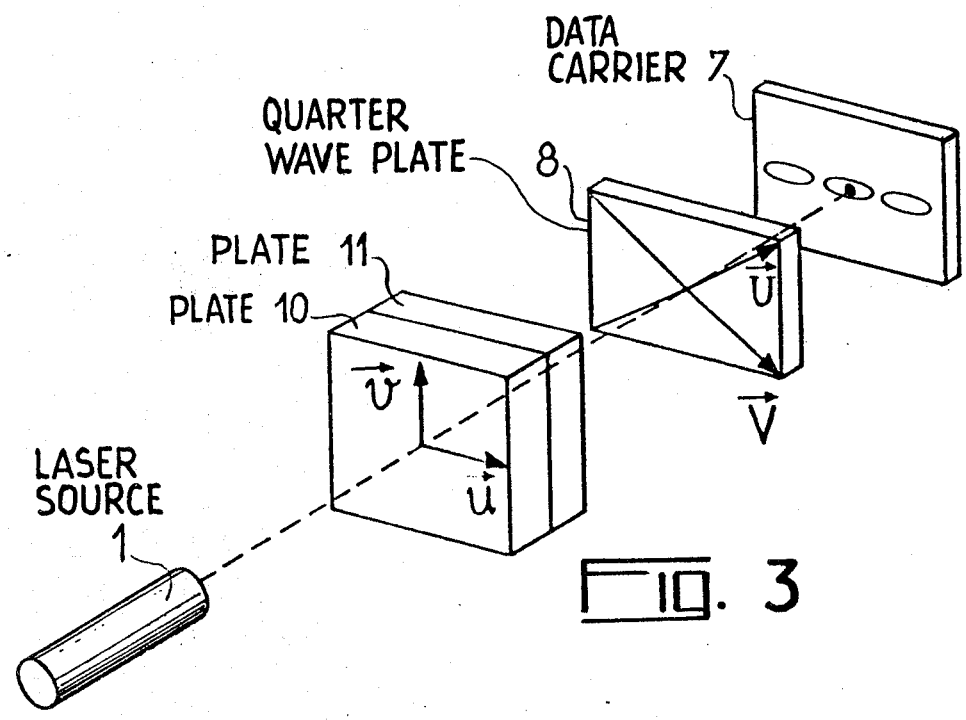
FIG. 3 is a diagram equivalent to the device shown in FIG. 2 in regard to the polarization changes.

An arrangement such as this is equivalent in regard to the effects of polarization and birefraction changes to the "equivalent" layout of FIG. 3 which shows, along a common optical axis, the laser source 1, a set of two plates 10 and 11, the first representing all the partial polarization effects of the various elements of the arrangement and the second representing the birefractive effects, the quarter wave plate 8 and a portion of the support to be read.

By studying the successive transformation of one of the modes emitted by the laser source during an outward and return passage in an arrangement such as this, it may readily be seen that the wave emitted and the first-order return wave are optically decoupled so that they are no longer capable of introducing any optical noise; one of the two circular vibrations emitted may be simply written as follows by decomposition along $\vec{u}$ and $\vec{v}$, assuming the amplitude of the two rectilinear vibrations to be equal to 1:

$$\vec{u} + i\vec{v}$$

i representing the phase shift $\pi/2$ between the two rectilinear vibrations for reconstituting the circular vibration.

The partial polarization effects due to the successive reflections are globally translated into different attenuations along the two axes. If $\alpha$ and $\beta$ are the attenuation coefficients, the vibration emerging from the thin plate 10 is $$\alpha\vec{u} + \beta i \vec{v}$$

The birefraction effects produce an additional phase-shift $\phi$ between the two rectilinear vibrations and the resulting vibration at the exit of the equivalent thin plate 11 is $$\alpha\vec{u} + \beta i \vec{v} e^{i\varphi} \quad (1)$$

Since the neutral lines of the quarter wavelength plate are oriented at 45° relative to the axes $\vec{u}$ and $\vec{v}$, and if $\vec{U}$ and $\vec{V}$ are the unit vectors on these neutral lines, the incident vibration given by the expression (1) is equal to:

$$\frac{\sqrt{2}}{2}(\alpha + i\beta e^{i\varphi})\vec{U} + \frac{\sqrt{2}}{2}(\alpha - i\beta e^{i\varphi})\vec{V}.$$

The double passage through the quarter wavelength plate and the reflection at the reflecting support 7 (which is assumed to be isotropic) has respectively resulted in a change in direction of one of the rectilinear vibrations along the neutral lines and in an attenuation introducing a coefficient $\rho$. The resulting vibration corresponding to the return wave at the exit surface of the quarter wavelength plate is thus:

$$\left[\frac{\sqrt{2}}{2}(\alpha + i\beta e^{i\varphi})\vec{U} - \frac{\sqrt{2}}{2}(\alpha - i\beta e^{i\varphi})\vec{V}\right]\rho e^{i\sigma}, \quad (2)$$

$e^{i\sigma}$ representing the phase shift introduced by the variations in length of the cavity.

The expression (2) is equal to:

$$(ie^{i\varphi}\beta\vec{u} + \alpha\vec{v})\rho e^{i\sigma}.$$

Passage through the equivalent plate 11 introduces another phase shift $\varphi$ between the two vibrations and the partial polarization due to the plate 10 produces an attenuation $\alpha$ along $\vec{u}$ and $\beta$ along $\vec{v}$. The return wave may therefore be written as follows:

$$(\alpha\beta i\vec{u} + \alpha\beta\vec{v})\rho e^{i(\sigma + \varphi)}.$$

The return vibration is thus circularly polarized in the opposite direction to the vibration emitted from which it emanated.

After reflection at the exit surface of the isotropic and perfectly reflecting laser cavity, the vibration emitted and the return vibration combine to give an elliptically polarized vibration which is equivalent to the sum of two rectilinear vibrations of different amplitudes, but constant in time.

The emitted vibration and the return vibration are therefore optically decoupled because they do not give rise to any beat phenomena.

Similar reasoning for the second circularly polarized vibration emitted by the laser source leads to the conclusion that the optical noise existing is created solely by the beats between the vibrations emitted by the laser and the second-order vibrations which have made two outward and return passages between the exit surface of the laser and the reflecting support. Since the second-order vibrations are heavily attenuated relative to the vibrations emitted, the optical noise prevailing is greatly reduced. For example, in a videodisc reader such as illustrated in FIG. 2, in which the reflection coefficient of the disc is 0.5 and the reflection coefficient of the separation plate 0.8, the detection cells situated in the plane 9 receive 8% of the energy emitted by the laser source, which is sufficient in the application under consideration. 2% of the energy is returned towards the emission surface of the source which, in the absence of the quarter wave plate, creates an optical noise such that the ratio of the amplitude of the noise to that of the signal is of the order of 1:7. With the quarter wavelength plate suitably oriented, this noise-to-signal ratio becomes 1:25 because the noise corresponds to only 0.4% of the energy emitted.

It will readily be appreciated that, irrespective of the quasi-total suppression of the noise due to the first-order return waves, the existing noise is weaker, the weaker the "coupling" between the exit surface of the laser source and the support.

Accordingly, it is important not to lose sight of the advantages obtained with a weak coupling between the exit surface of the source and the support, structure which, in conjunction with the use of a quarter wavelength plate in the path of the beam, enables a very low noise-to-signal ratio to be obtained.

On the same way, noise may also be reduced in an optical system for optically recording information on a support (or on a matrix from which the supports are produced).

Generally, any optical system of so-called "rectangular" structure comprising, on the one hand, a radiation source emitting vibrations which can be decomposed into orthogonal rectilinear vibrations along two rectangular axes defined by the structure, along which the rectilinear polarizations are maintained in regard to direction, and on the other hand two at least partly reflecting surfaces orthogonal to the optical axes which form an optical cavity and are therefore capable of producing optical noise harmful to the operation of the system, may be improved by introduction of a quarter wave plate in the vicinity of one of the reflecting surfaces.

What we claim is:

1. An optical device for projecting a radiation beam onto a moving reflective data carrier, said device comprising an illumination source having a reflective exit surface for emitting said beam, birefractive and partially polarizing optical elements for the propagation of said beam towards said data carrier along a path, said optical elements being arranged along said path for keeping two orthogonal directions, in the wave plane orthogonal to said path, invariant in relation to said propagation path, said beam being composed of waves circularly polarized, and an objective for concentrating said beam on said data carrier, said device further comprising a quarter wavelength plate relative to the mean wavelength of said beam, said plate being located on said path, parallel to said wave plane between the last of said optical elements and said objective, said plate having orthogonal neutral lines oriented at $\pi/4$ relative to said invariant orthogonal directions.

2. An optical device as claimed in claim 1 for the read-out of said data carrier further comprising reading cells and an optical separator element located for directing a part of said beam reflected by said substrate towards said reading cells, said part of said beam emerging from said separator element towards said cells transporting an energy greater than that transported by the beam emerging from the separator element towards the exit surface of said source.

3. An optical device as claimed in claim 2, wherein said invariant directions are respectively parallel and orthogonal to the incidence plane on the first of said optical elements, the others of said elements being oriented in such a way that the successive incidence planes on said elements have one of the two orientations parallel and orthogonal to said incidence plane on the first element.

* * * * *